United States Patent [19]

Smith

[11] 4,252,081
[45] Feb. 24, 1981

[54] FISH CAGE AND METHOD OF CLEANING FISH CAGE

[75] Inventor: Peter Smith, West-Loch Tarbert, Scotland

[73] Assignee: Marine Aquaculture (Scotland) Limited, Argyll, Scotland

[21] Appl. No.: 12,813

[22] Filed: Feb. 16, 1979

[51] Int. Cl.³ .............................................. A01K 61/00
[52] U.S. Cl. ......................................... 119/3; 114/256
[58] Field of Search ................. 119/3, 4, 5; 43/7, 102, 43/103; 114/74 T, 256, 326

[56] References Cited

U.S. PATENT DOCUMENTS

| 3,150,627 | 9/1964 | Stewart et al. | 43/7 X |
|---|---|---|---|
| 3,482,541 | 12/1969 | Kanbe | 114/256 X |
| 3,509,848 | 5/1970 | Salmon | 114/74 R X |
| 4,147,130 | 4/1979 | Goquel | 43/102 X |
| 4,170,196 | 10/1979 | Yoneya | 119/3 |

OTHER PUBLICATIONS

"Cylindrical Cages in Sea Loch," *Fish Farming International*, Sep. 1978.
"Rotatable Cage for High-Density Aquaculture," Caillouet, Charles, W., *The Progressive Fish-Culturist*, 34(1), 1972, p. 8.
"Aquaculture," Landless, 4, 1974, p. 323-328.

*Primary Examiner*—Gene Mancene
*Assistant Examiner*—Robert P. Swiatek
*Attorney, Agent, or Firm*—Murray and Whisenhunt

[57] ABSTRACT

The present invention provides a fish cage having a body portion and floats or weights attached thereto at one of a plurality of different positions so that the cage will float in water with a first part exposed and a second part submerged. Changing the position of attachment of the floats or weights results in different first and second parts being respectively exposed and submerged allowing successive cleaning of different first parts of the cage body.

15 Claims, 4 Drawing Figures

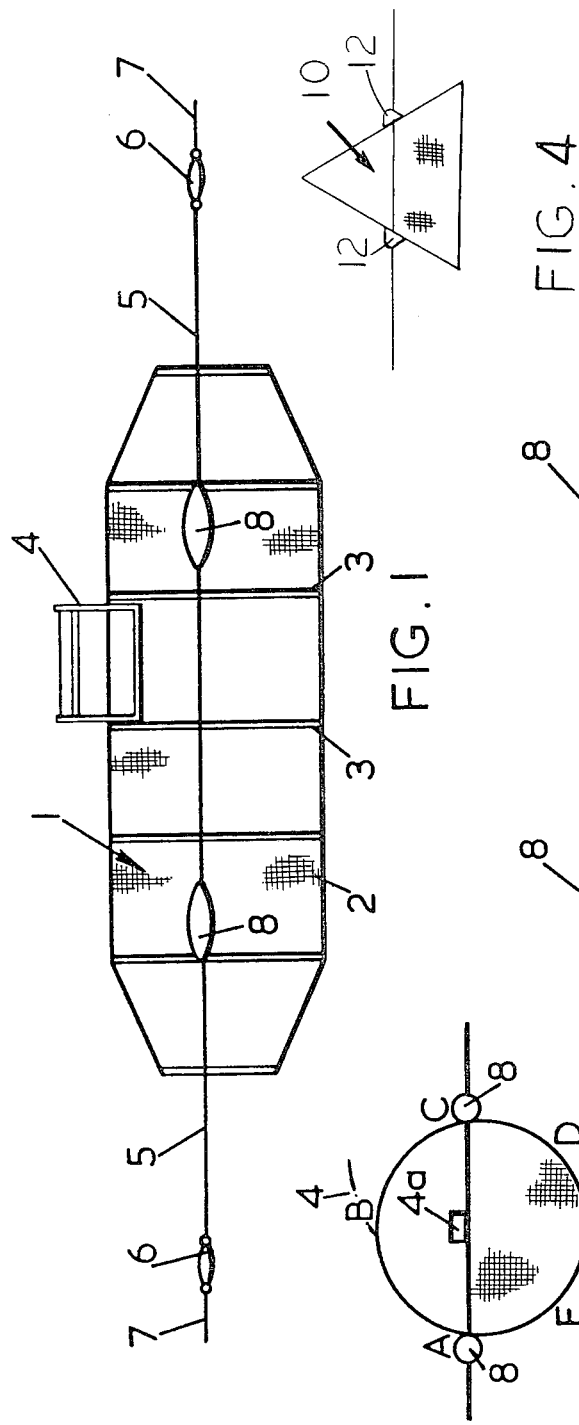
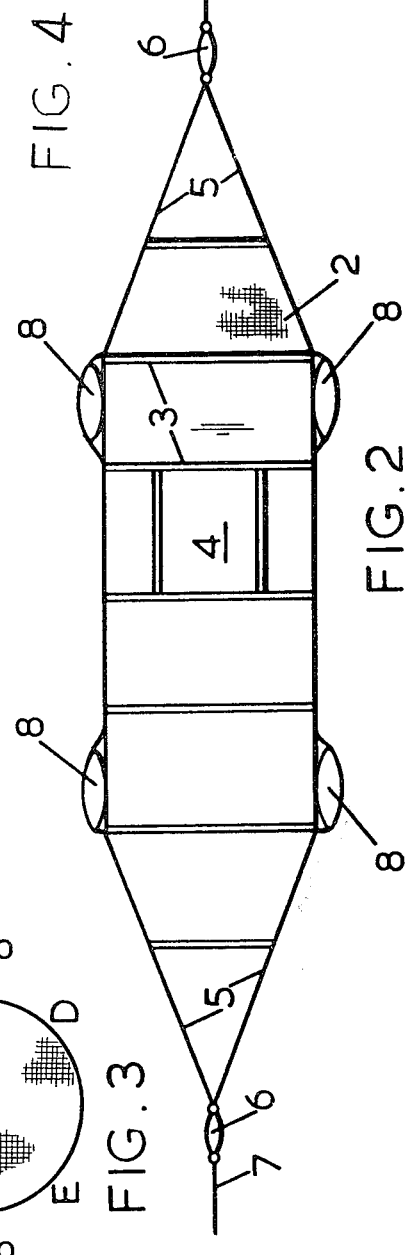
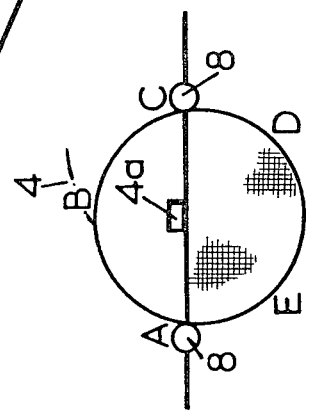

FISH CAGE AND METHOD OF CLEANING FISH CAGE

BACKGROUND OF THE INVENTION

This invention relates to a method for cleaning fish cages and to a fish cage adapted for use in said method.

During recent years, a substantial fish-farming industry has grown up, in which fish, confined within mesh cages, are reared in a manner analogous to that employed with farm animals. The cages usually used in fish farms are cuboidal with an open top. One severe problem encountered when using such cuboidal cages is that, after a few weeks use, the mesh sides and base of the cages become fouled and must be cleaned. At present such cleaning is effected by fixing a net around the outside of the cage to prevent fish escaping during the cleaning operation. The mesh panels constituting the sides and bottom of the cage are then removed individually for cleaning. Not only is such a cleaning process laborious (especially since the mesh panels, which may be twelve feet square, are not easy to handle), but it normally requires the provision of a walkway around at least part of the periphery of the cage, and this walkway adds to the cost of the cage.

The present invention seeks to provide a method of cleaning a fish cage, which method is less labour-consuming than that described above and which does not require the provision of a walkway around the cage. The present invention also provides a fish cage for use in said method.

SUMMARY OF THE INVENTION

Accordingly, the invention provides a method of cleaning a fish cage, which fish cage comprises a body portion of closed geometric form and at least one float and/or weight which can be attached to the body portion at a plurality of different positions such that when the float(s) and/or weight(s) is/are attached to the body portion at any one of said positions, the cage will float in water with a part of the exterior surface of the body portion protruding above the water, the remainder of said exterior surface lying below the water, the method comprising:

whilst the or each float and/or weight is attached to the body portion at one of said positions, cleaning at least part of the body portion exposed above water;

moving the or at least one of the floats and/or weights to a different one of said portions, thereby exposing a different part of the exterior surface of the body portion above water; and cleaning at least part of the body portion then exposed above water.

When the method of the invention employs a cage to which at least one weight may be attached at a plurality of positions, the cage may, of course, also be provided with an appropriate number of fixed and/or movable floats to give it the necessary buoyancy.

The invention also provides a fish cage capable of being used in the method of the invention, the fish cage comprising a body portion, of closed geometric form and having at least part of its exterior surface formed of mesh, and at least one float and/or weight which can be attached to the body portion at a plurality of different positions such that when the float and/or weight is attached to the body portion at any one of said positions, the cage will float in water with a part of the exterior surface of the body portion protruding above water and the remainder of said exterior surface lying below the water.

In saying that the fish cage of the invention is of closed geometric form, we do not exclude the possibility that the exterior surface of the fish cage may be provided with hatches or other means of access to the interior of the cage, provided that the hatches or other means of access can be kept closed when desired.

BRIEF DESCRIPTION OF THE DRAWINGS

A preferred method and fish cage of the invention will now be described in more detail, though by way of illustration only, with reference to the accompanying drawings, in which:

FIG. 1 is a side elevation of the preferred fish cage of the invention;

FIG. 2 is a top plan view of the fish cage shown in FIG. 1;

FIG. 3 is an end elevation of the fish cage shown in FIGS. 1 and 2; and

FIG. 4 is an end elevation of a fish cage having a substantially equilateral triangular cross-section.

DETAILED DESCRIPTION

The fish cage shown in FIGS. 1 to 3 has a body portion 1 formed of a flexible mesh 2 stretched over semi-rigid hoops 3 formed of hollow synthetic resin tubing. The cage has a central cylindrical portion, in which is a hatch 4 provided with latch means (not shown) to enable it to be kept closed when desired, this cylindrical portion being surmounted at either end by two frusto-conical portions. In the end face of one of these frusto-conical portions is formed a hatch 4a provided with latch means (not shown) to enable it to be kept closed when desired. This hatch 4a is spaced from the axis of the cage. Cables 5 are connected to these frusto-conical portions and pass to swivels 6, and the opposed sides of the swivels 6 are fixed to anchor cables 7 by means of which the cage is anchored. The cage further comprises two pairs of floats 8 which are fixed adjacent the opposed axial ends of the body portion 1 by tying them to the mesh 2. As best seen in FIG. 3, when the four floats 8 are attached to the body portion 1, the latter floats with approximately one-third of its exterior surface above the water and two-thirds below.

The fish cage shown in FIGS. 1 to 3 is cleaned by the method of the invention as follows. The hatch 4 is shut and kept closed by use of its latch means, and the part of the body portion above water (that between points A, B and C in FIG. 3) is cleaned in the conventional manner. Once this part of the operation has been completed, the floats at point A are moved to point B and those at point C to point D, whereupon the surface of the body portion lying between points B, C and D can be cleaned. By repeated movements of the floats, the whole surface of the body portion can be exposed for cleaning.

The fish cage shown in FIGS. 1 to 3 also facilitates "dipping" the fish therein, that is to say treating them with various chemicals, for example to remove parasites with which they may be infested. To carry out such dipping, a water-proof cover is placed over the part of the cage above water and, by movement of the floats 8 as described above, successive exposed sections of the cage are covered until the cage reaches a position in which the cover overlies all parts of the cage lying below water level. The water within the cover and cage is now isolated and any desired chemicals may be added, either through the mesh exposed above water or through the hatch 4.

If it is desired to transfer fish from one cage as shown in FIGS. 1 to 3 to another, an open-ended cylindrical mesh connecting member is fixed between the two cages so that the opposed open end of the connecting member surrounds the hatches 4a on the end surfaces of the two cages. The two hatches 4a are then opened, permitting fish to be transferred from one cage to the other.

It will be appreciated that the fish cage of the invention need not have the form shown in the accompanying drawings and could, for example, have the form of a polygonal prism. In particular, as shown in FIG. 4, a cage 10 having the form of an equilateral traiangular prism with weights 12 mounted as shown may be useful for rearing flat fish, since the bottom face of the prism affords a large horizontal surface on which the fish can lie.

Furthermore, instead of the floats 8 being tied to the body portion 1, the body portion may be provided, at the points where the floats are to be attached thereto, with retaining means capable of retaining one of the floats.

While the invention has been described in connection with one embodiment, it will be apparent to those skilled in the art that various changes and modifications can be made without departing from the spirit and scope of the invention.

What is claimed is:

1. A water-permeable fish cage stabilizable in a plurality of different partially submerged positions in water to facilitate cleaning of the cage while in the water, said cage comprising:
   (a) a body portion of closed geometric form for accommodating fish in water, said body portion having a water-permeable exterior surface formed of mesh through which water is freely flowable to and from said body portion;
   (b) a plurality of movable stabilizing buoyancy means connectable to said body portion at a plurality of different positions for moving said body portion in water between any one of a plurality of pre-determined rotational positions and stabilizing said body portion in one of said pre-determined rotational positions;
   (c) attachment means for attaching said buoyancy means to said body portion at said plurality of different positions;
movement of said buoyancy means to a plurality of different positions stabilizing said body portion in one rotational position and exposing a first part of said exterior surface of said body portion above water while a second part of said exterior surface lies submerged in the water, movement of said buoyancy means from said plurality of different positions to another plurality of said positions causing said cage to roll in the water and stabilize in another said rotational position to expose a different first part of said exterior surface above water while a different second part of said exterior surface lies submerged in the water;
   whereby each of said exposed first parts can be readily cleaned while the cage remains partially submerged in the water.

2. The fish cage of claim 1, wherein said buoyancy means includes at least one positive buoyancy having a density less than that of the surrounding water.

3. The fish cage of claim 1, wherein said buoyancy means includes only positive buoyancy having a density less than that of the surrounding water.

4. The fish cage of claim 1, wherein said buoyancy means includes at least one negative buoyancy having a density greater than that of the surrounding water.

5. The fish cage of claim 1, wherein said buoyancy means includes only negative buoyancy having a density greater than that of the surrounding water.

6. The fish cage of claim 1, wherein said buoyancy means includes at least one positive buoyancy having a density less than that of the surrounding water, and at least one negative buoyancy having a density greater than that of the surrounding water.

7. The fish cage of claim 1, wherein said body portion is of substantially circular cross-section.

8. The fish cage of claim 7, wherein said buoyancy means comprises floats attached to opposite sides of said body portion, said floats having a positive buoyancy relative to the buoyancy of said body portion such that approximately ⅓ of said exterior surface of said body is exposed above water and approximately ⅔ of said exterior surface of said body portion is submerged in the water.

9. The fish cage of claim 1, wherein said body portion is of substantially equilateral triangular cross-section.

10. The fish cage of claim 1, wherein said attachment means are mounted on said body portion at each of said plurality of different positions, for attachment of said buoyancy means to said body portion.

11. The fish cage of claim 1, wherein said buoyancy means is attached to an exterior circumference of said body portion.

12. A water-permeable fish cage stabilizable in a plurality of different partially submerged positions in water to facilitate cleaning of the cage while in the water, said cage comprising:
   (a) a body portion of closed geometric form for accommodating fish in water, said body portion having a water-permeable exterior surface formed of mesh through which water is freely flowable to and from said body portion;
   (b) movable stabilizing buoyancy means consisting of at least one positive buoyancy having a density less than that of the surrounding water connectable to said body portion at a plurality of different positions for moving said body portion in water between any one of a plurality of pre-determined rotational positions and stabilizing said body portion in one of said pre-determined rotational positions;
   (c) attachment means for ataching said buoyancy means to said body portion at said plurality of different positions;
movement of said buoyancy means to one of said plurality of different positions stabilizing said body portion in one rotational position and exposing a first part of said exterior surface of said body portion above water while a second part of said exterior surface lies submerged in the water, movement of said buoyancy means from said one of said plurality of different positions to another one of said positions causing said cage to roll in the water and stabilize in another said rotational position to expose a different first part of said exterior surface above water while a different second part of exterior surface lies submerged in the water.

whereby each of said exposed first parts can be readily cleaned while the cage remains partially submerged in the water.

13. A water-permeable fish cage stabilizable in a plurality of different partially submerged positions in water to facilitate of the cage while in the water, said fish cage comprising a body portion of closed geometric form for accommodating fish in water, said body portion having a water-permeable exterior surface formed of mesh through which water is freely flowable to and from said body portion; movable stabilizing buoyancy means connectable to said body portion at a plurality of different positions for moving said body portion in water between a plurality of pre-determined rotational positions and stabilizing said body portion in a pre-determined rotational position, said buoyancy means including at least one positive buoyancy having a density of less than that of the surrounding water, and at least one negative buoyancy having a density greater than that of the surrounding water; and attachment means for attaching said movable stabilizing buoyancy means to said body portion at a plurality of different positions, said buoyancy means and said body portion each having a buoyancy relative to each other, such that when said buoyancy means is attached to said body portion at any one of said plurality of different positions, said cage will float in water with a first part of said exterior surface of said body portion protruding above water and a second part of said exterior surface of said body portion lying submerged in the water, movement of said buoyancy means from said one of said plurality of different positions to another one of said positions causing said cage to roll in the water to expose a different first part of said exterior surface above water while a different second part of said exterior surface lies submerged in the water; whereby each of said first exposed parts can be readily cleaned while the cage remains partially submerged in the water.

14. A method of cleaning a fish cage having a body portion of closed geometric form for accommodating fish in water, said body portion being stabilizable in a plurality of different partially submerged positions in water and having a water-permeable exterior surface through which water is freely flowable to and from said body portion, said method comprising the steps of:
(a) providing a plurality of moveable stabilizing buoyancy means connectable to said body portion at a plurality of different positions for moving said body portion in water between any one of a plurality of pre-determined rotational positions and stabilizing said body in one of said pre-determined rotational positions;
(b) connecting said buoyancy means to a plurality of different positions to stabilize said body portion in one of said rotational positions and expose a first part of said exterior surface of said body portion above water while a second part of said exterior surface lies submerged in the water;
(c) cleaning at least a portion of said first part exposed above water;
(d) moving said buoyancy means to a different plurality of different positions so that said body portion rolls in the water and stabilizes in a different rotational position to expose a different first part of the exterior surface above water while a different second part lies submerged in the water;
(e) cleaning at least a portion of said different first part of said exterior surface exposed above water, said cage remaining partially submerged in the water during cleaning of each of said exposed first parts of said exterior surface.

15. A method of cleaning a fish cage having a body portion of closed geometric form for accommodating fish in water, said body portion being stabilizable in a plurality of different partially submerged positions in water and having a water-permeable exterior surface through which water is freely flowable to and from said body portion, said method comprising the setps of:
(a) providing a movable stabilizing buoyancy means consisting of at least one positive buoyancy having a density less than that of the surrounding water connectable to said body portion at a plurality of different positions for moving said body portion in water between any one of a plurality of pre-determined rotational positions and stabilizing said body in one of said pre-determined rotational positions;
(b) connecting said buoyancy means to one of said plurality of different positions to stabilize said body portion in one of said rotational positions and expose a first part of said exterior surface of said body portion above water while the second part of said second exterior surface lies submerged in the water;
(c) cleaning at least a portion of said first part exposed above water;
(d) moving said buoyancy means to a different one of said plurality of different positions so that said body portion rolls in the water and stabilizes in a different rotational position to expose a different first part of the exterior surface above water while a different second part lies submerged in the water;
(e) cleaning at least a portion of said different first part of said exterior exposed above water, said cage remaining partially submerged in the water during cleaning of each of said exposed first parts of said exterior surface.

* * * * *